Sept. 16, 1958                 M. ROSIN                 2,851,922

VARIABLE OPTICAL PROJECTION DEVICE

Filed Jan. 22, 1957                                  3 Sheets-Sheet 1

INVENTOR.
MORRIS ROSIN
BY
ATTORNEY.

Sept. 16, 1958  M. ROSIN  2,851,922
VARIABLE OPTICAL PROJECTION DEVICE
Filed Jan. 22, 1957  3 Sheets-Sheet 2

INVENTOR.
MORRIS ROSIN
BY
ATTORNEY.

Sept. 16, 1958     M. ROSIN     2,851,922
VARIABLE OPTICAL PROJECTION DEVICE
Filed Jan. 22, 1957     3 Sheets-Sheet 3

INVENTOR.
MORRIS ROSIN
BY
ATTORNEY.

United States Patent Office 2,851,922
Patented Sept. 16, 1958

2,851,922

VARIABLE OPTICAL PROJECTION DEVICE

Morris Rosin, Detroit, Mich.

Application January 22, 1957, Serial No. 635,183

8 Claims. (Cl. 88—24)

This invention relates to a variable optical projection device and more particularly to a compactly arranged projection device in which the work surfaces are arranged at a convenient angle for operation, and a system of movable and fixed mirrors and a fixed lens are arranged to produce enlarged or reduced images of a given object upon correlated movement of the movable mirrors, for viewing, reproduction, copying, tracing, projection and photographing.

This invention is related to my copending patent application, Serial No. 600,546, filed July 27, 1956, for "Variable Optical Projection Device."

The invention comprises a closed, compartmented housing having a pair of glass covered openings on the top surface of the housing each exposing a compartment, a guided, controlled movable mirror in each compartment arranged to receive or reflect light rays from and to the work planes, a fixed system including a pair of mirrors positioned at each side of a lens located at the partition dividing the chamber into compartments in which one of the fixed mirrors receives light rays from the movable mriror in its compartment and passes through the fixed position lens to the fixed mirror in the second compartment which, in turn, reflects the light rays to the movable mirror in its compartment and thence to the work plane as a projected image.

The housing is arranged with a fairly horizontal top working surface that is slightly at an angle for the convenience of the operator. The compartments are arranged with sources of light that operate to pass light rays to opaque objects positioned on one of the glass work planes, if such light is required. A system of controls for adjustably positioning the movable mirrors is employed, the particular arrangement here disclosed being merely a preferred one of several that can be used.

Because the device here shown and described is very compactly arranged, it can be set up either as a floor model or as a table supported model. Although the glass work planes may be of the same size, in the interests of an efficient structure—because it is the purpose of the device to enlarge or reduce images in size—one of the work planes is preferably smaller than the other. This change is arranged by reducing the width of one of the work planes, leaving its length or height—as one may choose to call it—equal to that of the other. By having the two work planes side by side, the device is rendered extremely compact, efficient and economical in terms of the use effort of the operator to view, reproduce, enlarge, reduce, copy, trace or photograph by means of the inventive device.

It is therefore an object of the invention to provide a variable optical projection device having parallel, side by side, coplanar work planes for an object and its projected image. It is another object to provide a system of independently movable mirrors in conjunction with a set of fixed mirrors and lens to receive and project light rays from and to the work planes. It is a further object to compactly arrange the mirror and lens system in a compartmented housing having the parallel adjacent work planes on its top surface. A further object is to provide a control system for moving the movable mirrors independently, so as to enlarge or reduce the size of the projected image on the receiving work plane. It is still another object to provide such a device in which either transparent, translucent or opaque objects may be optically projected. And it is still a further object to provide a structural arrangement that can be either floor mounted or table mounted. Another object is to provide a compact, efficient and economical device that is easily operated by relatively unskilled or semi-skilled personnel, and in which the correction for focused enlargement or reduction is by very simple means.

These and additional objects of the invention and features of construction, including slight modifications thereof, will become more clearly apparent from the description given below, in which the terms are used for purposes of description and not of limitation.

Referring now to the drawing annexed hereto and forming an integral part of this specification, Fig. 1 is a perspective view of the inventive construction, partially in section, and showing the interior arrangement of the mirrors and lens of a floor model.

Figure 1:
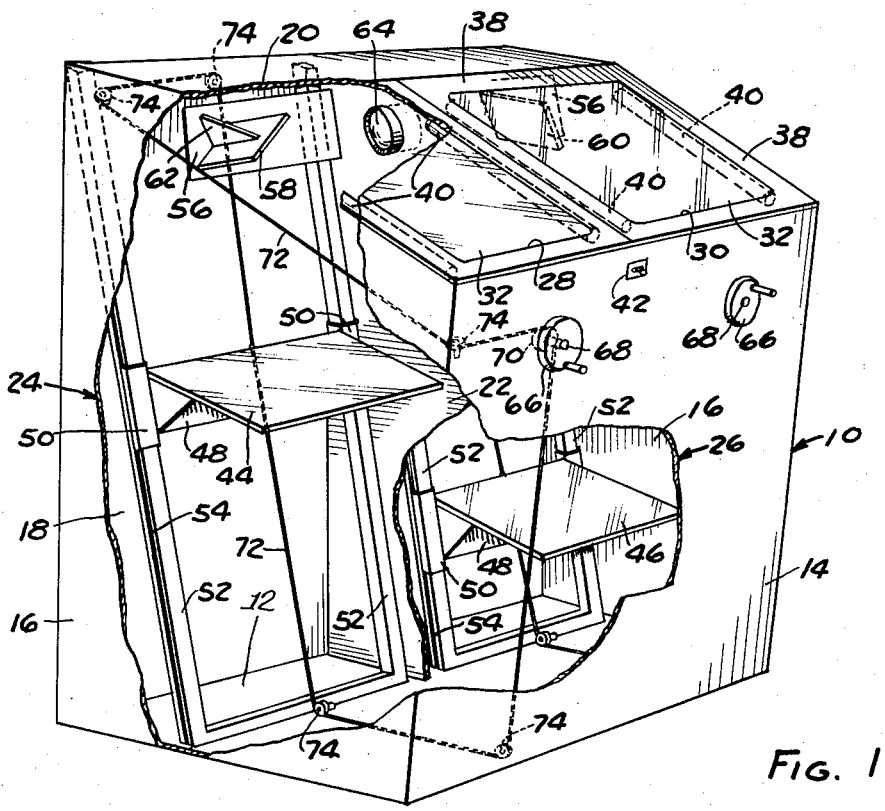
Figure 2:
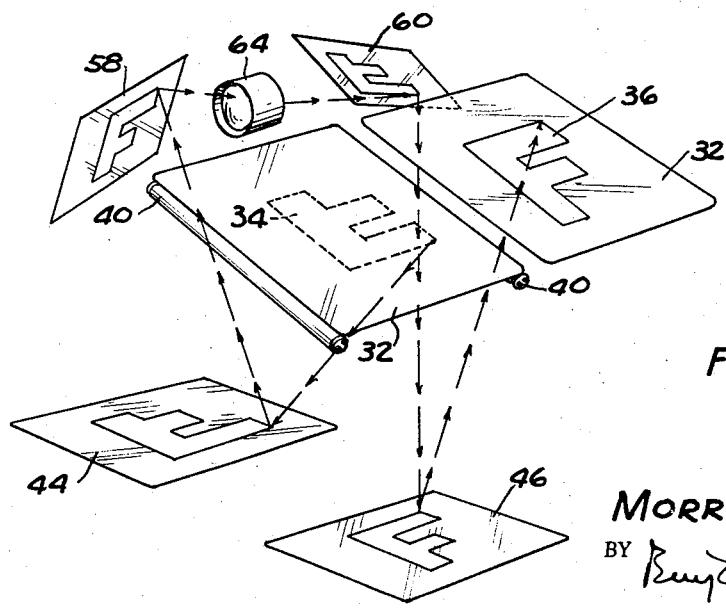
Fig. 2 is a diagrammatic view of the two parallel adjacent work planes, the movable mirrors, and the fixed mirrors and lens, showing the path of a light ray from an object, shown in dotted lines, to its projected image, shown in solid lines.
Figure 5:
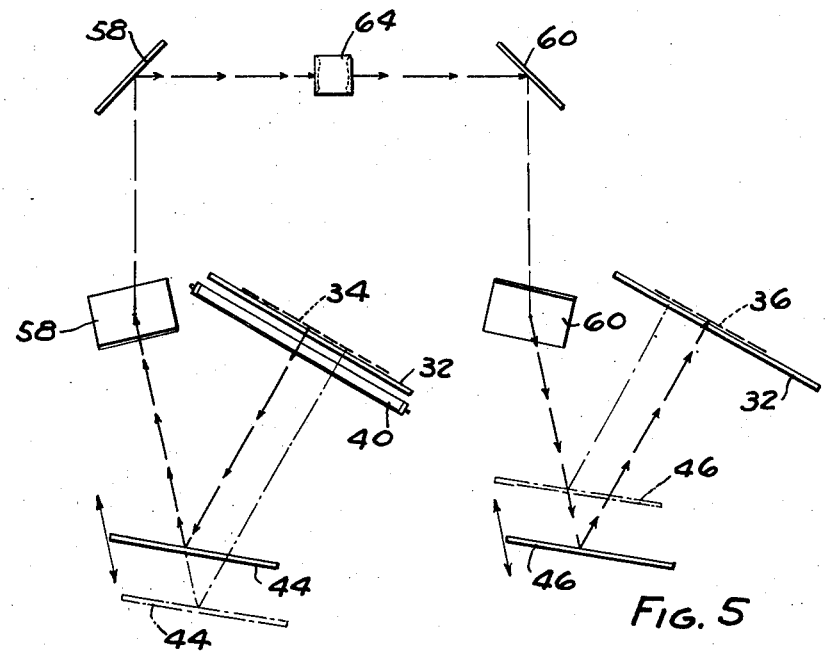
Figs. 5 and 6 are diagrammatic views of the paths of light rays traveling in the floor model of Fig. 1 and the table model of Fig. 3, respectively.
Figure 6:
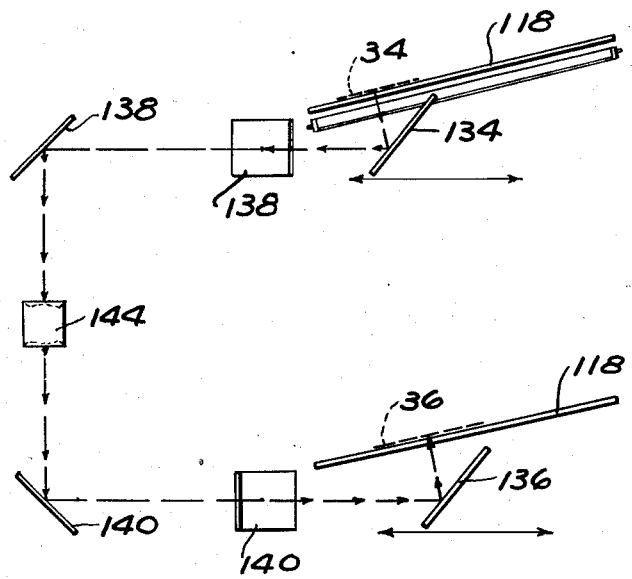

As shown in the several views of the drawings, and with particular reference to Figs. 1, 2 and 5, the variable optical projection device comprises a housing 10 having a base 12, a front wall 14, side walls 16, a rear wall 18 and a top surface 20.

The housing 10 is arranged into compartments by a partition wall 22 extending from the base 12 to the top surface 20 and from the rear wall 18 to the front wall 14. These compartments will be designated and referred to as the object compartment 24 and the image compartment 26.

The top surface 20 is provided with an opening 28 over the object compartment 24 and an opening 30 over the image compartment 26, the designations given to these compartments being arbitrary and for the purpose of more clearly describing the structure. It should be understood that either compartment work surface may be used for an object or an image, depending upon whether an enlargement or a reduction is required. In each such opening, is a fixedly mounted solid transparent work surface or plane 32, such as a glass pane or light which will support an object 34 to be enlarged or reduced in size as a projected image 36. The work surfaces 32 should be sufficiently strong to permit an operator to place a sheet of tracing material thereon and to trace the outline or details of the projected image 36, or to position a photographic device for and make a photograph of the image thereon. The work surface 32 is preferably made of sheet ground glass or similar image receiving material. When used with photographic devices, such as a film pack, a clear transparent glass work surface is preferred. When such a film pack is used, the work surface surrounding the film pack should be made light-tight, so that only the projected image is reflected by the movable mirror.

The work surfaces 32 are designed further to be used by copiers, tracers, photographers and others who require reproductions, copies, tracings, photographs, and similar projections of the objects which are placed on the object work surface. It should be kept in mind that the object work surface may be either of the two work surfaces, the choice depending upon whether an enlargement or a reduction in size is desired. The larger work surface should carry the projected image if an enlargement is needed, or should carry the object if a reduction is needed. In this way, more efficient use of the housing space is advantageously made.

The work surfaces 32 are each surrounded by a mask portion 38 of the top surface 20, underneath which are suitably mounted fluorescent light tubes 40 or similar light sources operated by a source of power controlled by a three-way switch 42 mounted on the front wall 14. When the switch is thrown to the left, the tubes 40 of the compartment 24 light up, and when to the right, the tubes 40 of the compartment 26 light up.

The movable mirrors 44 and 46 are each fixedly mounted on a frame 48 having an outboard channel 50 arranged to slide over guide rods 52. The channels 50 each have an inturned flange which slides in a guide groove 54 of the rod 52. A sliding friction fit for channels 50 are recommended so that upon adjustable positioning of the mirrors 44 or 46, the terminal position is maintained without further manipulation. Several types of sliding friction devices are presently available on the market, and it is not deemed necessary to specify in detail a particular device which is to be used, it being understood that persons skilled in the art to which the invention pertains will readily be able to select an arrangement that will serve satisfactorily. The guide rods 52 are secured to the housing 10 at the base 12 and at the top surface 20, leaving the sides free for sliding of the mirror frame 48.

The movable mirrors 44 and 46 are positioned, with respect to the plane of the work surfaces 32, in such a way that light rays are reflected from the work surfaces to the upper rearward part of each compartment. Secured to the partition wall 22, and where required or necessary to the surface 20 and the side walls 16 also, is a mirror support or mount 56, in each compartment, on which is fixedly attached a mirror 58, 60 by a member 62. The mirrors 58 and 60 are arranged at right angles to each other, the supports 56 being coplanar. Fixedly positioned between the mirrors 58 and 60, and preferably in the partition wall 22, is a lens 64 so arranged as to pass light rays between the fixed mirrors, as in Fig. 2. The axis of the lens 64 is contained in a plane normal to the planes of the fixed mirrors 58, 60. The lens 64 is preferably of the fixed focus type, although a variable focus lens may also be used.

When the projected image 36 is of the same magnitude as the work object 34, the distance of the work object on its work plane 32 to the lens 64 is the same as that from the lens to the projected image on its work plane 32.

Apparatus for moving the movable slidable mirrors 44 and 46 comprises a crank 66, mounted by a shaft 68 on the front wall 14, a grooved wheel 70 on the rearward end of the shaft 68, about which wheel is wound a few turns of a cable 72. The cable is threaded about a series of free turning, grooved wheels or guides 74 and fixedly attached to the mirror frame 48 by a suitable fastener. The cable may be of any suitable flexible material, sufficiently resilient and strong to slidingly move the mirrors 44 and 46 on their guide rods 52. The grooved wheels or cable guides 74 are attached by suitable fasteners and means to the rear wall 18, side walls 16, base 12 and front wall 14, as required. The particular cable arrangement shown in Fig. 1 is preferred but is not the only one which can be made to accomplish the required function. Turns of the crank 66 will slidingly move the mirror 44 or 46 upon the guide rods 52 toward or away from the fixed mirror 58 or 60, respectively.

Figure 3:
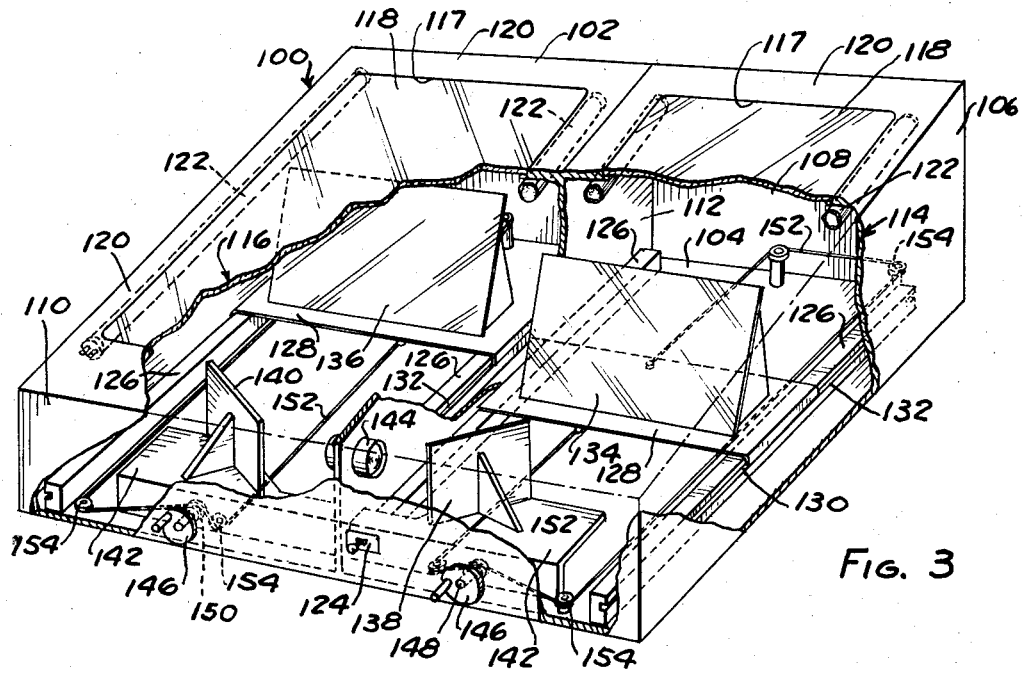
Fig. 3 is a perspective view of the inventive construction, partially in section, and showing the interior arrangement of the mirrors and lens of a table model.
Figure 4:
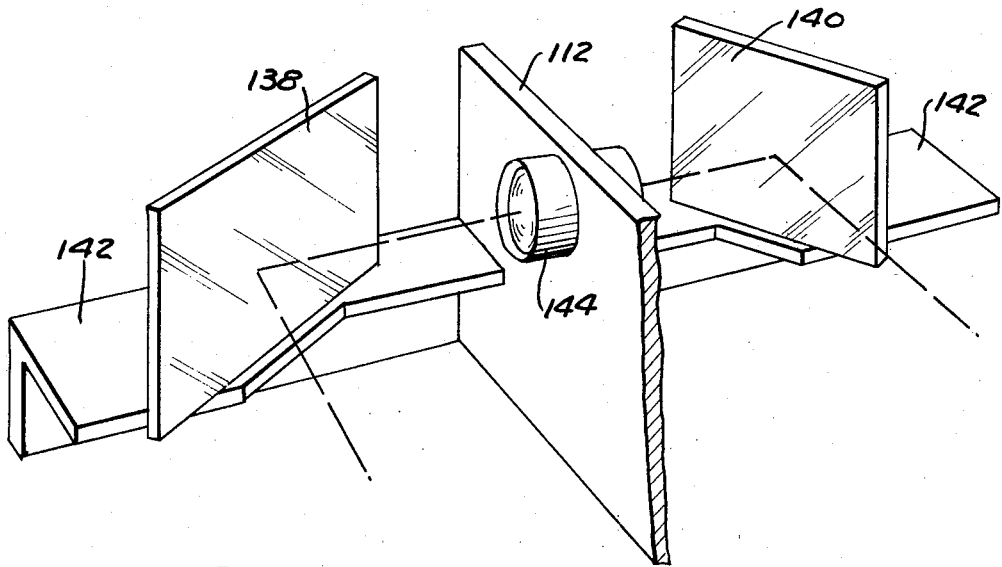
Fig. 4 is a slightly enlarged fragmentary view of the fixed mirror and lens arrangement of either table or floor model.

It will be readily seen by reference to Fig. 3 that the table model structure there shown comprises the same elements as in the structure of Fig. 1, arranged similarly. The table model unit however is much more compact, the movable mirrors being arranged to move horizontally toward and away from the fixed mirror and lens system which is now in the forward part of the housing.

The model structure, shown in Fig. 3, comprises a housing 100 having a top surface 102 arranged at a convenient angle to the horizontal for the operator, a base 104, side walls 106, a rear wall 108 and a front wall 110. Secured to the base, the front wall, the rear wall and the top surface is a partition wall 112 dividing the housing into two compartments 114 and 116, as in the floor model. The compartments are preferably of unequal width so as to provide for greater enlargement and reduction, and a more efficient use of the space in the housing.

The top surface 102 is provided with openings 117 for work surfaces 118, preferably of glass as before, masked by portions 120 beneath which are suspended fluorescent light tubes 122 for providing a source of light. A three-way light switch 124 passes power to the light tubes 122 in compartment 114 when thrown to the right, and in compartment 116 when thrown to the left.

Fixedly secured to the base 104, in each compartment, are a pair of parallel guide rods 126 on which is slidingly mounted a mirror support frame 128 having outboard channels guided on the rods by inturned flanges 130 which ride in the grooves 132. The mirror frame 128 fixedly supports a mirror 134 or 136 for reflection of light rays from or to the work surfaces 118.

The movable sliding mirrors 134 and 136 are arranged to move toward or away from the fixed mirrors 138 and 140, respectively, mounted at the forward end of housing 100 on the supports 142 at each side of the partition wall 112. The fixed mirrors 138 and 140 are positioned at right angles to each other on the coplanar supports 142. A lens 144 is mounted in the partition wall 112 between the mirrors 138 and 140 so as to pass light rays therebetween. As in the floor model, the axis of lens 144 is contained in a plane normal to the planes of the fixed mirrors 138 and 140.

Apparatus of the type described above for the floor model unit to movably slide the mirrors 134 and 136 comprises a crank 146, on a shaft 148 rotatably positioned in the front wall 110, having a grooved wheel 150 on the rear end of the shaft, on which wheel is wound a few turns of a cable 152. The cable is threaded about a series of free-turning grooved wheels or guides 154 and fixedly secured to the mirror frame 128 by a suitable fastener. The guides or wheels 154 are fixedly mounted on the base 104, the particular cable arrangement shown in Fig. 3 being a preferred one.

The path of a light ray passing from an object 34, in the floor model of Fig. 1, is shown in Fig. 5, wherein the ray strikes the movable mirror 44 and is reflected to the fixed mirror 58. From there it is passed through the fixed lens 64 in the partition wall 22, to the complementary mirror 60, thence to the movable mirror 46, and to the work surface 32 where it becomes a projected image 36. The movable mirrors 44 and 46 are arranged to lie in parallel planes and to lie at such an angle to the work surfaces and the fixed mirrors as to pass the maximum number of light rays by reflection without axial distortion of the beam. Enlargement or reduction will thus be determined by the relative distances of the movable mirrors to the object and the projected image work surfaces.

In operation, the inventive constructions of Figs. 1 and 3 perform similarly. An object 34 is placed upon the work surface 32 of compartment 24, as in Fig. 2. The light switch 42 is thrown to the left passing power to fluorescent lamps 40, whereby light rays strike the object. These rays then pass to the movable mirror 44, are reflected to the fixed mirror 58, through the lens 64 to the complementary fixed mirror 60, to the movable mirror 46 and up to the work surface 32 of compartment 26, where the light beam becomes the projected image 36.

To adjust the image for size and focus, the cranks 66, for moving each compartment mirror, are turned clockwise or counterclockwise until the projected image is in sharp focus on the work surface 32 of compartment 26. Bringing the movable mirror 44 closer to fixed mirror 58 and moving the movable mirror 46 further away from fixed mirror 60 in the compartments 24 and 26, respectively, enlarges the projected image 36. Reversing the corresponding mirror relationships, reduces the projected image.

The table model of Fig. 3 operates in an identical manner. A beam of light reflected from an object 34 on the work surface 118 of compartment 114 is passed to the movable mirror 134, thence reflected to the fixed mirror 138, through lens 144 to the complementary fixed mirror 140, from there reflected to the movable mirror 136, and to the work surface 118 of compartment 116, where it produces a projected image 36.

Adjustment of the projected image for sharp focus and size is accomplished by turning cranks 146 clockwise or counterclockwise so as to move the movable mirrors 134 and 136 toward or away from the fixed mirrors 138 and 140, respectively.

Because of the positioning of the work surfaces of the two models in respect to the movable mirrors, as the movable mirrors approach the fixed mirrors they also approach the work surfaces, thus reducing the size of the image projected onto the movable mirrors. Therefore, to reduce the projected image with respect to the object size, the movable mirrors in the projected image compartments are moved closer to the fixed mirrors in these compartments, and to enlarge the projected image, the reverse is done, i. e. the movable mirrors are moved farther away from the fixed mirrors.

To obtain precise image focus and image size, the movable mirror in one compartment of the model must be adjustably positioned, by means of its crank on the front wall, with respect to the object and the complementary movable mirror in the second compartment.

The compactness and arrangement of the inventive device here disclosed is particularly suited to viewing, copying, tracing, reproduction, photography, etc. in the simplest, most facile manner. The object 34 is placed on a top surface which is coplanar with the projected image 36 that develops at its side. The object is easily moved about to position the projected image where and as desired. The principal advantages of the device lie in its unique compact arrangement of the parts, providing a unitary device of considerable scope and versatility.

Having described the invention in its simplest terms, it is to be understood that the details of construction may be changed and varied in greater or lesser degree without departing from the essence of the invention defined in the appended claims.

I claim:

1. In a variable optical projection device, a partitioned compartmented housing, a top surface in said housing having a light transmitting coplanar adjacent work plane for each compartment, an adjustable, movable, guided reflector and a fixed reflector in each compartment, and a lens fixedly mounted in the partition between said fixed reflectors, said movable reflectors, fixed reflectors and lens being aligned and adapted to project light rays from an object on one of said work planes as an image of said object onto the other of said work planes, said fixed reflectors being at right angles to each other about said lens and arranged with respect thereto so that the axis of said lens is contained in a plane normal to said fixed reflectors, said movable reflectors being parallel to each other and arranged at an angle to said top surface whereby light rays from and to said work planes strike upon said movable reflectors.

2. In a variable optical projection device, a partitioned compartmented housing, a top surface in said housing having a light transmitting coplanar adjacent work plane for each compartment, a manually controlled, movable, guided reflector and a fixed reflector in each compartment, and a lens fixedly mounted in the partition between said fixed reflectors, said movable reflectors, fixed reflectors and lens being aligned together and adapted to project light rays from an object on one of said work planes as an image of said object onto the other of said work planes, said fixed reflectors being at right angles to each other about said lens and arranged with respect thereto so that the axis of said lens is contained in a plane normal to said fixed reflectors, said movable reflectors being parallel to each other and arranged at an angle to said top surface whereby light rays from and to said work planes impinge upon said movable reflectors.

3. In a variable optical projection device for enlarging or reducing the size of projected images, a partitioned compartmented housing, a top surface in said housing having a light transmitting coplanar adjacent work plane for each compartment, a manually controlled, movable, guided reflector and a fixed reflector in each compartment, and a lens fixedly mounted in the partition between said fixed reflectors, said movable reflectors being parallel to each other, guidingly movable in parallel paths, and arranged at an angle to said top surface whereby light rays from and to said work planes impinge upon said movable reflectors, the reflecting plane surfaces of said fixed reflectors being at right angles to each other about said lens and arranged with respect thereto so that the axis of said lens is contained in a plane normal to said fixed reflectors, said movable reflectors, fixed reflectors and lens being aligned together and adapted to project light rays from an object on one of said work planes as an image of said object onto the other of said work planes.

4. In a variable optical projection device for enlarging or reducing the size of projected images, a partitioned compartmented housing, a top surface in said housing having a light transmitting coplanar adjacent work plane for each compartment, a manually controlled, movable, guided reflector and a fixed reflector in each compartment, and a lens fixedly mounted in the partition between said fixed reflectors, said movable reflectors being parallel to each other, movable in parallel paths and arranged at an angle to said top surface whereby light rays from and to said work planes impinge upon said movable reflectors, the reflecting plane surfaces of said fixed reflectors being at right angles to each other about said lens and arranged with respect thereto so that the axis of said lens is contained in a plane normal to said fixed reflectors, said movable reflectors, fixed reflectors and lens being optically aligned together and adapted to project light rays from an object on one of said work planes as an image of said object onto the other of said work planes, said movable reflectors being movable toward and away from said fixed reflectors whereby to enlarge or reduce the projected image.

5. In a variable optical projection device for enlarging or reducing the size of projected images, a housing partitioned into two compartments, a top surface in said housing having a light transmitting coplanar adjacent work plane for each compartment, a manually controlled, movable, guided plane reflector and a fixed plane reflector in each compartment, and a lens fixedly mounted in the partition between said fixed reflectors, said movable reflectors being arranged parallel to each other, movable in parallel paths toward and away from their respective fixed reflectors and at an angle to said top surface whereby light rays from and to said work planes impinge upon said movable reflectors, the reflecting surfaces of said fixed reflectors being at right angles to each other about said lens and arranged in respect thereto so that the axis of said lens is contained in a plane normal to said fixed reflectors, said movable reflectors, fixed reflectors and lens being optically aligned together to project light rays from an object on one of said work planes as an image of said object onto the other of said work planes.

6. The construction defined in claim 5, in which said movable reflectors are guidingly movable on means arranged at a slight angle to the vertical in each compartment.

7. The construction defined in claim 5, in which said movable reflectors are guidingly movable on means arranged horizontally in each compartment.

8. The construction defined in claim 5, and in which sources of light are located on the underside of said top surface in each compartment to cast rays onto and through said light transmitting work planes, and manually controlled switch means for said sources of light.

References Cited in the file of this patent
UNITED STATES PATENTS

| | | |
|---|---|---|
| 2,181,134 | Katz | Nov. 28, 1939 |
| 2,341,042 | Hill | Feb. 8, 1944 |
| 2,431,612 | Furnas | Nov. 25, 1947 |